United States Patent [19]

Waddington

[11] 3,844,432

[45] Oct. 29, 1974

[54] SELF-LOADING RAILWAY CAR

[76] Inventor: William H. Waddington, 1969 Sheffield Ln., Wheaton, Ill. 60187

[22] Filed: Jan. 8, 1973

[21] Appl. No.: 321,714

[52] U.S. Cl. ............................................. 214/517
[51] Int. Cl. ............................................ B60p 1/64
[58] Field of Search ............ 214/38 B, 38 BA, 38 C, 214/38 CC, 515, 516, 517

[56] References Cited
UNITED STATES PATENTS

| | | |
|---|---|---|
| 2,004,095 | 6/1935 | Hankins et al.................. 214/517 X |
| 2,783,899 | 3/1957 | Gutridge........................... 214/38 A |
| 2,892,554 | 6/1959 | Decker............................. 214/38 C |
| 3,252,608 | 5/1966 | Proler .............................. 214/38 C |
| 3,650,421 | 3/1972 | Miller............................... 214/77 R |

*Primary Examiner*—Robert G. Sheridan
*Attorney, Agent, or Firm*—John L. Cline

[57] ABSTRACT

A railway car including apparatus for loading cargo containers onto the car. It is especially adapted for loading truck trailers which are to be transported in piggyback fashion.

2 Claims, 5 Drawing Figures

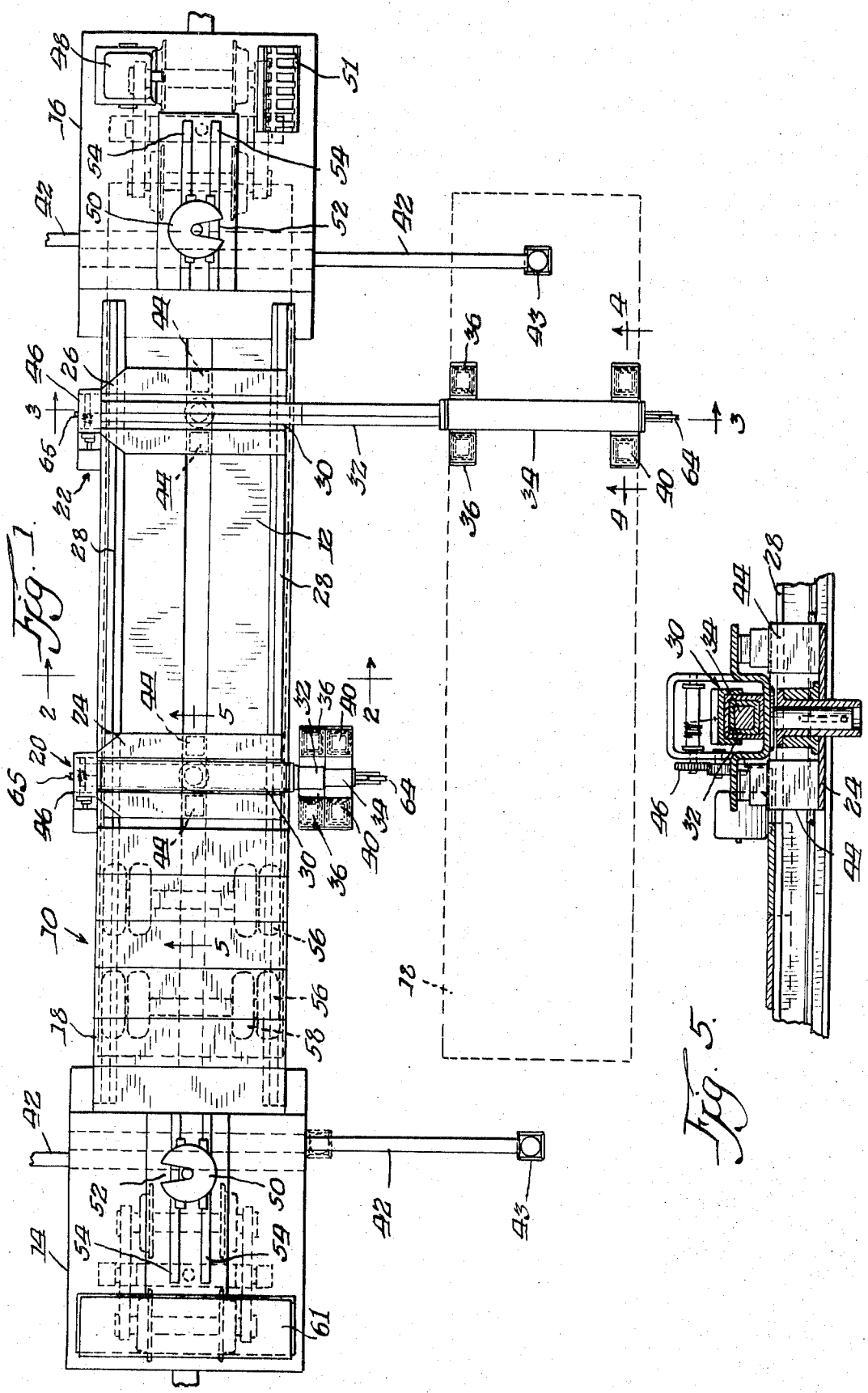

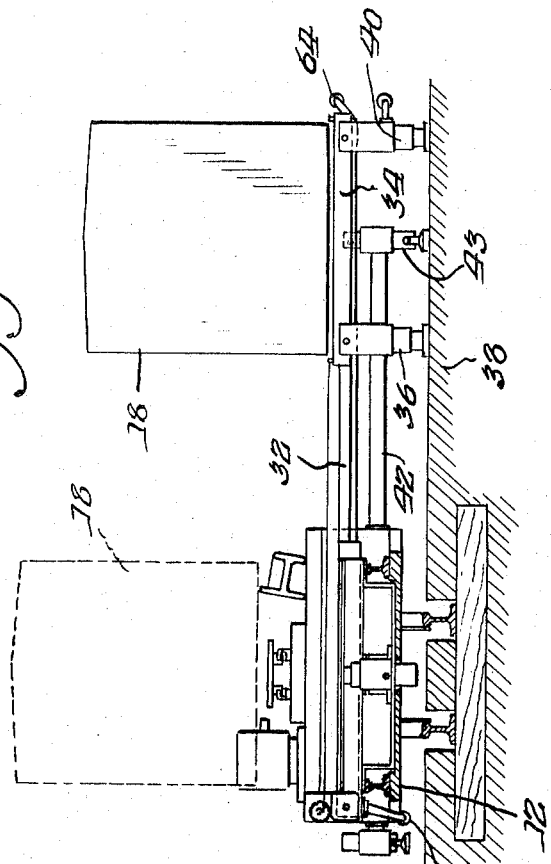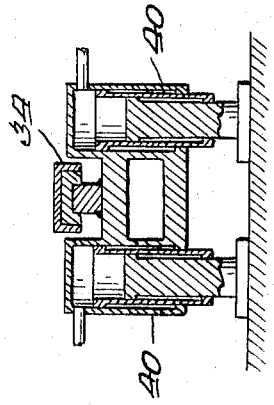

SELF-LOADING RAILWAY CAR

BACKGROUND OF THE INVENTION

This invention relates to cargo handling apparatus and in particular an improved railway car which includes mechanisms for loading the car.

The "piggyback" system of transporting truck trailers has become a very significant method of transporting cargo. Several systems for loading and unloading the truck trailers onto and from the railway cars have been devised. Many of these systems require complex and cumbersome pieces of equipment to accomplish this task. Also, many of the prior systems require that the loading and unloading operation be done at a particular location, i.e., the location of the loading apparatus.

SUMMARY OF THE INVENTION

This invention presents a railway car which includes all the mechanisms necessary for loading and unloading cargo containers or truck trailers from the car. Consequently, the railway car is a self-contained unit that does not require additional equipment to perform the loading operations. This permits the loading and unloading operations to take place at any point where it is desirable instead of being tied to the yards where auxiliary loading apparatus is maintained.

The car includes a pair of horizontally extendable arms for positioning under a truck trailer. Hydraulic means are provided to raise the arms with the trailer placed thereon. The trailer is then slid into position over the railway car and the arms are lowered to position the trailer on the car. The arms are then retracted and the railway car may be transported to its destination.

BRIEF DESCRIPTION OF THE DRAWINGS

The features of this invention will become more apparent in the following detailed description of a preferred embodiment read in conjunction with the figures in which:

FIG. 1 is a top plan view of a railway car embodying the principles of this invention with a truck trailer shown in phantom along side.

FIG. 2 is a cross-sectional view of a portion of FIG. 1 showing the apparatus in position to raise a truck trailer and load it onto the railway car.

FIG. 3 is a cross-sectional view taken along lines 3—3 and FIG. 1 and looking in the direction of the arrows.

FIG. 4 is a cross-sectional view taken along lines 4—4 and FIG. 1 and looking in the direction of the arrows.

FIG. 5 is a cross-sectional view taken along line 5—5 in FIG. 1 and looking in the direction of the arrows.

DETAILED DESCRIPTION OF A PREFERRED EMBODIMENT

Referring to the figures, wherein like reference numerals indicate like parts, a railway car is indicated generally at 10. The railway car 10 is of the flat bed type having a lower bed 12 intermediate to raised end portions 14, 16. A truck trailer 18 is indicated in phantom along side the car 10 in FIG. 1. The trailer 18 is to be loaded onto the bed 12 of the car 10.

To load the trailer 18 onto the car 10, the bed 12 carries a pair of loading assemblies 20, 22. The loaders 20, 22 are carried on plates 24, 26. The plates 24, 26 are slidable along rails 28 (see FIG. 3) disposed on the bed 12. Thus the loading assemblies 20, 22 may be moved along the longitudinal axis of the car 10.

The loaders 20, 22 include a telescopic hydraulic cylinder 30 which is pivotally attached to the respective plates 24, 26. The hydraulic cylinder 30 preferrably includes two extendible portions 32, 34. In FIG. 1 the loader 20 is shown in a retracted position and the loader 22 shows the telescopic hydraulic cylinder 30 with its sections horizontally extended. A pair of vertically acting telescoping feet 36 are disposed at the end of the intermediate section 32. As may be seen in FIG. 2 the feet 36 are movable vertically by hydraulic cylinders for resting on the ground 38. Similarly a pair of extendible feet 40 are disposed at the end of the outermost section 34 for resting on the ground.

To stabilize the car 10 during loading and unloading, a pair of extendible arms 42 are disposed on the undercarriage of the car 10 and have extendible vertically acting feet 43 disposed at the end thereof. A pair of arms 42 are provided at each end 14, 16 of the car 10 to permit stabilization regardless of which side the trailer 18 is being loaded from.

The loaders 20, 22 are pivotally connected to the plates 24, 26 to permit them to be swung to opposite sides of the car to accept a trailer 18 from either side. Each loader 20, 22 includes a pair of vertically acting hydraulic cylinders 40, 44 to lift the loaders 20, 22 when the trailer 18 is loaded on the car 10. Each loader 20, 22 also includes a power operated winch 46 disposed at the end of the loader 20, 22 for ultimately bringing the trailer 18 onto the car 10.

The hydraulic mechanisms are operated by a motor 48 and a operator's console 51. The specific hydraulic conduits and linkages are not necessary to an understanding of this invention and consequently have not been illustrated herein.

Each end portion 14, 16 of the car 10 includes a cylindrical locking member 50 with a v-shape cutout 52 for accepting the "fifth wheel" of the trailer 18. The locking members 50 are slidable along rails 54 which are disposed on the end portions 14, 16. Thus the locking members 50 can be adjusted depending on the position of a fifth wheel of a specific trailer 18.

A pair of plates 56 are slidably disposed on the rails 28 to provide a resting place for the wheels 58 on the trailer 18. Note in FIG. 1 that a trailer is indicated in phantom on the bed 12 and that the wheels 58 rest on the adjustable plates 56.

OPERATION

To load and unload a trailer 18 onto and off from a car 10 the following sequence events takes place. First, the stabilizing arms 42 are horizontally extended as shown in FIG. 1. The vertically movable feet 43 are lowered until they are in contact with the ground as shown in FIG. 2. The loaders 20, 22 are adjusted on the bed 12 to the proper position with respect to the trailer 18. Both sets of arms 32, 34 are extended horizontally to the position depicted by the right loader 22 in FIG. 1. The vertically movable feet 36 and 40 are then lowered until they contact the ground as shown in FIGS. 2 and 3.

At this point a pair of shims 56, 58 are placed over the arms 32, 34 and a carriage 60 is positioned under the trailer 18 as shown in FIG. 3. The shims 56, 58 provide a smooth surface on which the carriage 60 may be slid and may be stored in a bin 61 when not in use. The carriage 60 is coupled by means of a cable 62 to the winch 46.

With the carriage 60 in position underneath the trailer 18 the vertically acting hydraulic cylinders 44, 36 and 40 act simultaneously to raise the trailer 18 and the loaders 20, 22 until the wheels of the trailer clear the rails 28 on the car 10.

The winches 46 are then activated to pull the carriages 60 onto the loaders 20, 22 and of course simultaneously bring the trailer 18 to a position overlying the car 10. The vertically acting cylinders 36, 40 and 44 are then retracted to position the trailer 18 on the bed 12 and the retraction is continued until the cylinders are completely telescoped. The plates 56, 58 are placed in the bin 61. The horizontally extendible cylinders 32, 34 are then retracted to the position shown on loader 20 in FIG. 1. The stabilizing arms 42 are then retracted after the vertically movable feet 43 have been retracted. At this point the trailer 18 is on the bed 12 with its fifth wheel positioned in one of the locking members 50 and the car 10 in fully loaded and may be sent to its destination.

When the loaded car 10 arrives at its destination the trailer 18 may be unloaded from the car 10 by merely reversing the above described sequence. Specifically, the stabilizing arms 42 are horizontally extended to the position shown in FIG. 1 and the vertically movable feet 43 are extended until they reach the ground. The loader arms 32, 44 are horizontally extended and the feet 36, 40 are extended until they are firmly established on the ground. The loaders 20, 22 and the vertically adjustable feet 36, 40 are then simultaneously raised until the under carriage of the trailer clears the rails 28 on the car 10.

The cables 62 are then run underneath the car 10 and around pulleys 64, 65 disposed on the end of the arm 34 and on the car 10 as shown in FIG. 3 and attached to the carriages 60. The winch 46 is then activated and the trailer 18 is pulled from the car 10 by the carriages 60 until it arrives at the position at which it can be lowered to the ground. The vertically acting cylinders 36, 40 and 44 are then retracted to place the trailer 18 on the ground 38 and the horizontally acting arms 32, 34 may then be retracted. The stabilizing feet 43 are retracted and then the stabilizing arms 42 are retracted into the car as shown in FIG. 3.

In an alternative embodiment of the invention the horizontally extendable arms do not utilize telescoping hydraulic cylinder 30. The extendable arms are constructed to the appropriate length and pivoted to the side of car. A pair of such arms may be disposed to each side of the car. In this embodiment the trailer may be loaded onto the car from one side and unloaded from the other. As is apparent, vertically extendable platforms would be disposed on the bed to mote with the horizontally extendable arms when they are in position for loading and unloading. The remaining features would be the same as in the first described embodiment.

What is claimed is:

1. A self-loading railway car comprising:
   a pair of loader arms disposed on said car;
   each of said loader arms comprising a pivotally mounted horizontally extensible telescoping hydraulic cylinder for placement under a truck trailer and a telescoping hydraulic cylinder for vertically raising and lowering said horizontally extensible arms and a truck trailer carried by said arms;
   means for permitting said loader arms to move along the length of said car to accomodate different designs of truck trailers;
   stabilizing means disposed on said railway car comprising horizontally and vertically extensible means for stabilizing said railway car during loading and unloading operations;
   means for moving a truck trailer along said arms when said arms are extended for loading a truck trailer onto said railway car and for unloading a truck trailer from said railway car; and
   means for accepting the fifth wheel of said truck trailer when said trailer is on said car.

2. The railway car set forth in claim 1 wherein said moving means comprises a carriage slidable along each of said loader arms and power means for moving said carriages.

* * * * *